(12) United States Patent
Vasudevan et al.

(10) Patent No.: US 10,149,150 B1
(45) Date of Patent: *Dec. 4, 2018

(54) UPDATING PROFILES FOR SECONDARY WIRELESS DEVICES

(71) Applicant: Apple Inc., Cupertino, CA (US)

(72) Inventors: Chandiramohan Vasudevan, Sunnyvale, CA (US); Rohan C. Malthankar, San Jose, CA (US); Prashant H. Vashi, Sunnyvale, CA (US); Viswanath Nagarajan, San Jose, CA (US); Vikram Bhaskara Yerrabommanahalli, Saratoga, CA (US); Rafael L. Rivera-Barreto, Santa Clara, CA (US); Samuel J. Miller, Cupertino, CA (US); Kannan Jeyakumar, San Francisco, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,345

(22) Filed: Apr. 16, 2018

Related U.S. Application Data

(63) Continuation of application No. 15/612,986, filed on Jun. 2, 2017, now Pat. No. 9,949,113.

(51) Int. Cl.
*H04W 8/00* (2009.01)
*H04W 8/24* (2009.01)
*H04W 4/50* (2018.01)

(52) U.S. Cl.
CPC ............... *H04W 8/24* (2013.01); *H04W 4/50* (2018.02)

(58) Field of Classification Search
CPC .................................. H04W 8/24; H04W 4/50
See application file for complete search history.

(56) References Cited

U.S. PATENT DOCUMENTS

| 9,451,098 | B2 | 9/2016 | Zhu et al. | |
| 9,949,113 | B1* | 4/2018 | Vasudevan | H04W 8/24 |
| 2012/0108204 | A1 | 5/2012 | Schell et al. | |
| 2012/0331292 | A1 | 12/2012 | Haggerty et al. | |
| 2013/0295997 | A1* | 11/2013 | Sen | H04W 76/11 |
| | | | | 455/558 |
| 2013/0344857 | A1* | 12/2013 | Berionne | H04W 88/02 |
| | | | | 455/418 |

(Continued)

*Primary Examiner* — Khai M Nguyen
(74) *Attorney, Agent, or Firm* — Dickinson Wright RLLP

(57) ABSTRACT

Techniques to manage updates for eSIMs of a secondary wireless device are disclosed. Responsive to a user input, expiration of a timer, receipt of a message from an associated primary wireless device, processing circuitry of the secondary wireless device commands an eUICC to update an eSIM. A secure data connection is established between the eUICC and a network provisioning server, either directly from the secondary wireless device to a cellular wireless network or relayed indirectly via the primary wireless device. The eUICC and the network provisioning server exchange messages in accordance with a BIP process to update the eSIM. The eUICC provides a status to the processing circuitry indicating success or failure for the eSIM update. Upon success, a portion of the secondary wireless device may be placed in a reduced power state. Upon failure, the eSIM update process may repeat up to a maximum number of retries.

20 Claims, 7 Drawing Sheets

(56) References Cited

U.S. PATENT DOCUMENTS

| | | | | |
|---|---|---|---|---|
| 2015/0119017 A1* | 4/2015 | Wu | ................. | H04W 76/10 |
| | | | | 455/419 |
| 2016/0020802 A1 | 1/2016 | Lee et al. | | |
| 2016/0021529 A1 | 1/2016 | Park et al. | | |
| 2017/0289788 A1* | 10/2017 | Lalwaney | ........... | H04L 41/0803 |
| 2017/0331692 A1* | 11/2017 | Hague | ................ | H04L 41/0893 |

* cited by examiner

UPDATING PROFILES FOR SECONDARY WIRELESS DEVICES

CROSS-REFERENCE TO RELATED APPLICATIONS

This Application is a continuation of U.S. patent application Ser. No. 15/612,986, entitled "UPDATING PROFILES FOR SECONDARY WIRELESS DEVICES," filed Jun. 2, 2017, which is incorporated by reference herein in its entirety for all purposes.

FIELD

The described embodiments set forth techniques for updating electronic Subscriber Identity Modules (eSIMs) on embedded Universal Integrated Circuit Cards (eUICCs) included in cellular capable secondary wireless devices associated with a primary wireless device.

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a wireless network. Typically, a UICC takes the form of a small removable card, (commonly referred to as a Subscriber Identity Module (SIM) card), which is configured to be inserted into a UICC-receiving bay included in a wireless device. In more recent implementations, UICCs are being embedded directly into system boards of wireless devices. These embedded UICCs (eUICCs) can provide several advantages over traditional, removable UICCs. For example, some eUICCs include a rewritable memory that can facilitate installation, modification, and/or deletion of one or more eSIMs, which can provide for new and/or different services and/or updates for accessing extended features provided by MNOs. An eUICC can store a number of MNO profiles—also referred to herein as eSIMs—and can eliminate the need to include UICC-receiving bays in wireless devices. Moreover, eSIMs on eUICCs can be remotely managed from network servers communicating through mobile device processors to an eUICC of the mobile device.

Methods for managing eSIMs of mobile devices include both MNO-centric approaches, involving network equipment of an MNO, such as a provisioning server, communicating directly with an eUICC of a mobile device through an over-the-air (OTA) secure channel, and device-centric approaches, involving a processor of the mobile device initiating and/or participating in the management of eSIMs on the eUICC of the mobile device.

SUMMARY

Representative embodiments set forth techniques for managing updates of electronic Subscriber Identity Modules (eSIMs) of a secondary wireless device that is associated with a primary wireless device. Processing circuitry external to an embedded Universal Integrated Circuit Card (eUICC) included in the secondary wireless device initiates an eSIM update check when data connectivity is available either directly by the secondary wireless device or indirectly via the primary wireless device to a cellular wireless network. An eSIM update process can be initiated based on a user input to the secondary wireless device or to the primary wireless device. The eSIM update process can also be initiated based expiration of a timer without user input. The processing circuitry provides a command to the eUICC to trigger an applet to check for an eSIM update. In response to the command, the eUICC requests a secure data connection, which is established between the eUICC of the secondary wireless device and a network provisioning server of the cellular wireless network. In some embodiments, the secure data connection includes a cellular wireless connection directly from the secondary wireless device to the cellular wireless network. In some embodiments, the secure data connection includes a non-cellular wireless connection to the primary wireless device and a cellular wireless connection from the primary wireless device to the cellular wireless network. The eUICC requests an eSIM update from the provisioning server and obtains the eSIM update in response in accordance with a Bearer Independent Protocol (BIP). The eUICC provides a message that indicates a status of the eSIM update, and when the eSIM update succeeds, the processing circuitry of the secondary wireless device causes the secondary wireless device to enter a reduced power state. When the eSIM update fails, the processing circuitry repeats the eSIM update process until the eSIM update succeeds or a maximum number of retries occurs.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
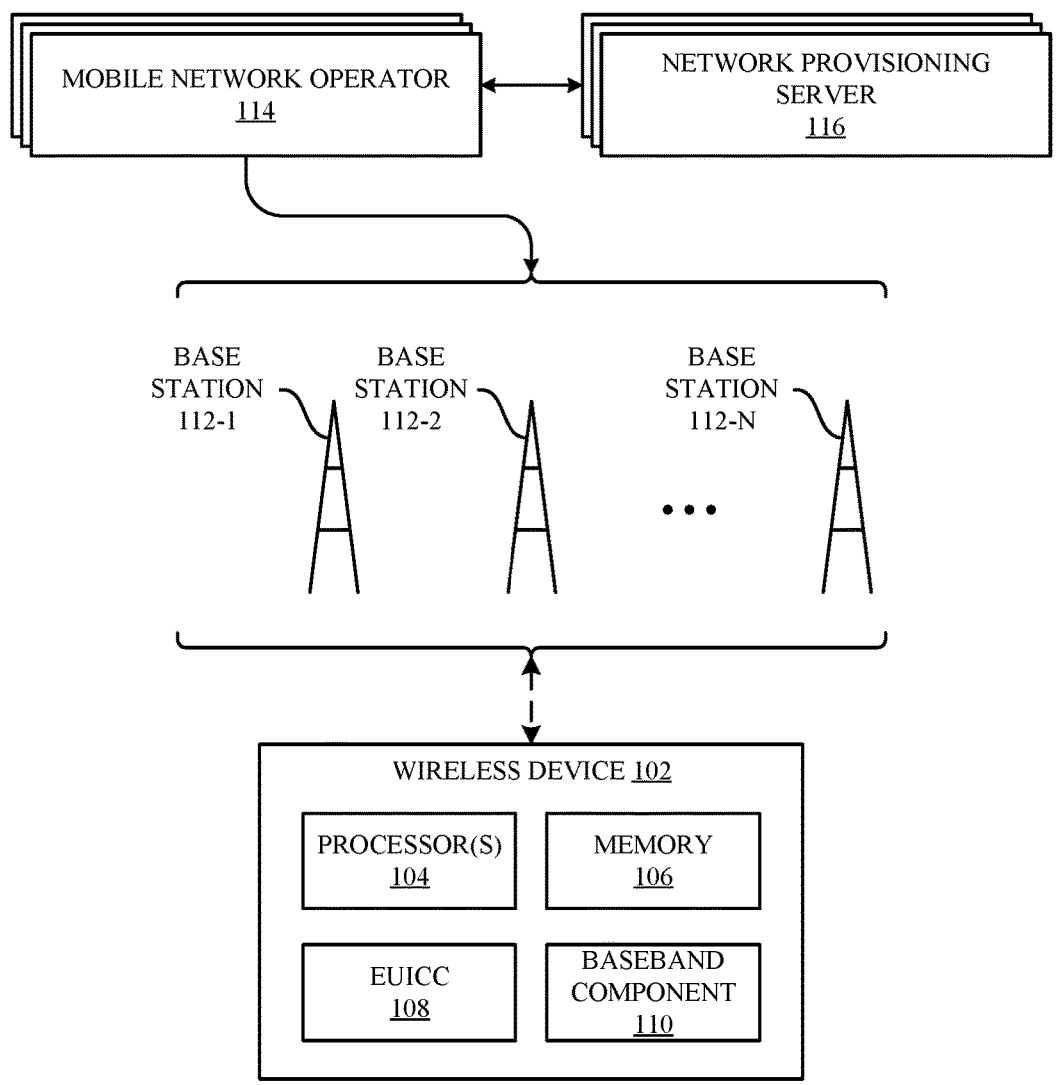
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that some UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments of methods and apparatus presented herein provide for updating electronic Subscriber Identity Modules (eSIMs), which can also be referred to as embedded SIMS or as profiles, of an embedded Universal Integrated Circuit Card (eUICC) of a secondary wireless device. eSIM profiles can be provisioned and activated using a Bearer Independent Protocol (BIP) by the eUICC of the secondary wireless device interacting with a Mobile Network Operator (MNO) network provisioning server using a secure over-the-air (OTA) data connection. Activation of the eSIM can enable the secondary wireless device to access wireless services subscribed to by a user of the secondary wireless device. Following initial provisioning and activation, the eSIM may require updating, such as when changes to a wireless network service occurs, when the user changes a subscription, when updating a mobile directory number (MDN), or when updating credentials of the eSIM that provide for authentication and/or access to services of a cellular wireless network. Updating of the eSIM can be based on a user-initiated BIP process, such as when a user selects to check for an update via an input of the secondary wireless device (or via an input of an associated primary wireless device), or based on a network-initiated BIP process. While most cellular wireless devices are camped on, attached to, connected with, registered for service with, or otherwise associated with a cellular wireless network for most of the time, a new category of cellular wireless devices includes those cellular wireless devices that may be disconnected or de-registered from the cellular wireless network for most of the time and infrequently connected to or registered for service with the cellular wireless network. Providing eSIM updates to infrequently connected wireless devices, such as to secondary wireless devices that connect with cellular wireless networks directly some of the time and connect via an associated primary wireless device at other times, requires adjusting BIP processes to account for infrequent connections.

As the secondary wireless device may not be registered with a cellular wireless network all of the time, a network-initiated BIP process, such as by the cellular wireless network contacting the secondary wireless device using a short message service (SMS) may not reliably provide for an OTA update of an eSIM of the secondary wireless device. While cellular wireless devices that are normally attached to or connected with a cellular wireless network can reliably receive an SMS message to initiate an OTA eSIM update, a secondary cellular wireless device that infrequently attaches to or connects with the cellular wireless network may not connect often enough to receive the OTA eSIM update. Connecting more frequently can consume more battery power and thus may be not preferred for secondary wireless devices with limited battery power resources. In some embodiments, a secondary wireless device can be de-registered from service with the cellular wireless network, or the eSIM of the secondary wireless device can be disabled or otherwise not usable at times to conserve power or to limit direct cellular wireless connections with the cellular wireless network. A device-initiated BIP process may also be unreliable, such as when an applet of an eUICC of the secondary wireless device is unaware of whether a data connection for the secondary wireless device is available. The applet can attempt to check for eSIM updates repeatedly when no data connection is available and exhaust all retries available. In addition, without knowledge of a status of an eSIM update BIP process, processing circuitry of the secondary wireless device can be unaware of when the eSIM update BIP process has completed successfully or failed and can remain awake and thus be unable to enter a reduced power state to conserve limited battery resources.

Responsive to a user-initiated action, e.g., an input to check for an eSIM update, processing circuitry of the secondary wireless device can determine whether data connectivity is available to establish a secure data connection with a network provisioning server via the cellular wireless network. Alternatively, without user input, such as based on expiration of a timer and/or when connected to an external power source, the processing circuitry can autonomously determine whether data connectivity is available (or can cause registration or otherwise attach the secondary wireless device to a cellular wireless network) to allow for eSIM update checking to occur. When data connectivity is available, the processing circuitry can initiate an eSIM update process by sending command to the eUICC of the secondary wireless device to trigger an applet on the eUICC to check for eSIM updates. In response to the command, the eUICC requests a secure data connection, which is established between the eUICC of the secondary wireless device and a network provisioning server of the cellular wireless network. In some embodiments, the secure data connection includes a cellular wireless connection directly from the secondary wireless device to the cellular wireless network. In some embodiments, the secure data connection includes a non-cellular wireless connection to an associated primary wireless device and a cellular wireless connection from the primary wireless device to the cellular wireless network. The eUICC requests an eSIM update from the provisioning server and obtains the eSIM update in response in accordance with a Bearer Independent Protocol (BIP). The eUICC provides to the processing circuitry a message that indicates a status of the eSIM update, and when the eSIM update succeeds, the processing circuitry of the secondary wireless device causes the secondary wireless device to enter a reduced power state, in some embodiments. When the eSIM update fails, the processing circuitry repeats the eSIM update process until the eSIM update succeeds or a maximum number of retries occurs.

In some embodiments, when the secondary wireless device is paired with a primary wireless device, the primary wireless device can receive a notification to trigger an eSIM update. The notification can be delivered to the primary wireless device via an Apple Push Notification Service (APNS). In response to receipt of the notification, the primary wireless device can send a message to the secondary wireless device to command the secondary wireless device to perform the eSIM update process. The secondary wireless device can request a secure data connection to a network provisioning server of a cellular wireless network in order to perform the eSIM update. The secure data connection can be established between the eUICC of the secondary wireless device as a relayed connection through the primary wireless device, including an OTA cellular wireless connection between the primary wireless device and the cellular wireless network and a non-cellular wireless connection between the primary wireless device and the secondary wireless device. The eSIM update process can use a BIP process and can end upon successful completion of the BIP process, which can be indicated by the eUICC to the processing circuitry in a status message. The eSIM update process can also end when a maximum number of retries to complete the BIP process occurs, such as when successive failures of the BIP process are reported in status messages from the eUICC. Upon completion, the processing circuitry of the secondary wireless device can request that the secure data connection be brought down to conserve battery power.

These and other embodiments are discussed below with reference to FIGS. 1 through 7; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, a group of base stations 112 that are managed by different Mobile Network Operators (MNOs) 114, and a set of provisioning servers 116 that are in communication with the MNOs 114. According to the illustration of FIG. 1, the wireless device 102 can represent a mobile computing device (e.g., an iPhone®, an iPad®, or an Apple Watch® by Apple®), the base stations 112 can represent different radio towers that are configured to communicate with the wireless device 102, and the MNOs 114 can represent different wireless service providers that provide specific services (e.g., voice and data) to which the wireless device 102 can be subscribed. In some embodiments, the wireless device 102 is a secondary wireless device that is associated with another wireless device 102, which can be referred to as a primary wireless device. For example, the secondary wireless device can be a wrist wearable device that pairs with a smart phone that serves as the primary wireless device. The secondary wireless device can share at least some of wireless services to which a user of the primary wireless device subscribes. In some embodiments, the secondary wireless device can form direct cellular wireless connections with a cellular wireless network. In some embodiments, the secondary wireless device uses direct cellular wireless connections only when indirect non-cellular wireless connections via the primary wireless device are not available, such as when the secondary wireless device is separated at a sufficient distance from the primary wireless device that a non-cellular wireless connection to the primary wireless device cannot be established.

As shown in FIG. 1, the wireless device 102 can include processing circuitry, which can include one or more processors 104 and a memory 106, an eUICC 108, and a baseband component 110. These components work in conjunction to enable the wireless device 102 to provide useful features to a user of the wireless device 102, such as localized computing, location based services, and Internet connectivity. The eUICC 108 can be configured to store multiple eSIMs for accessing the different MNOs 114 through the base stations 112. For example, the eUICC 108 can be configured to store and manage one or more eSIMs for one or more MNOs 114 for different subscriptions to which the wireless device 102 is associated. To be able to access services provided by the MNOs, an eSIM is provisioned to the eUICC 108. In addition, eSIMs stored on the eUICC 108 can be updated, modified, enabled, disabled, and/or deleted via communication between the eUICC 108 of the wireless device 102 and applicable network equipment, such as the provisioning servers 116 (or other equivalent or similar network-based eSIM management entities, such as a Subscription Manager-Data Preparation (SM-DP) unit). In some embodiments, eSIMs are pre-stored in the eUICC 108 in a disabled state, and during a provisioning process, the eUICC 108 obtains MNO credentials (e.g., keys, etc.), service information (e.g., carrier information, services subscribed to), and/or other information, and uses this information to enable the eSIM. In some embodiments, eSIMs are not pre-stored in the eUICC 108, and the eUICC 108 obtains one or more eSIMs from one or more associated provisioning servers 116. It is noted that provisioning servers 116 can be maintained by a manufacturer of the wireless device 102, the MNOs 114, third party entities, and the like. Communication of eSIM data between a network provisioning server 116 and the eUICC 108 can use a secure data communication channel, over which a series of commands between the network provisioning server 116 and the eUICC 108 results in provisioning (or other management such as updating) of an eSIM to (or on) the eUICC 108. In some embodiments, the eSIM data is communicated via the processing circuitry, e.g., the processor 104, of the wireless device 102. In some embodiments, the eSIM data is communicated to the processor 104 of the wireless device 102 for loading to and/or installing in the eUICC 108 while connected to the network provisioning server 116. In some embodiments, eSIM data is communicated to the processor 104 for subsequent loading to and/or installing in the eUICC 108 without a parallel connection to the provisioning server and/or secure through connection between the provisioning server and the eUICC 108 during the loading and/or installation process, e.g., using an offline process. Although not illustrated in FIG. 1, the wireless device 102 can also be configured to include a receiving bay for a removable UICC (e.g., a SIM card), on which an eSIM can be updated in a similar manner using the techniques described herein. In some embodiments, the eSIM data for the eUICC 108 of the wireless device 102, e.g., of a secondary wireless device, is communicated via another wireless device 102, e.g., via a primary wireless device, that forms a cellular wireless connection to the network provisioning server 116 as a relayed connection between the eUICC 108 of the secondary wireless device through the primary wireless device to the network provisioning server 116.

Figure 2:
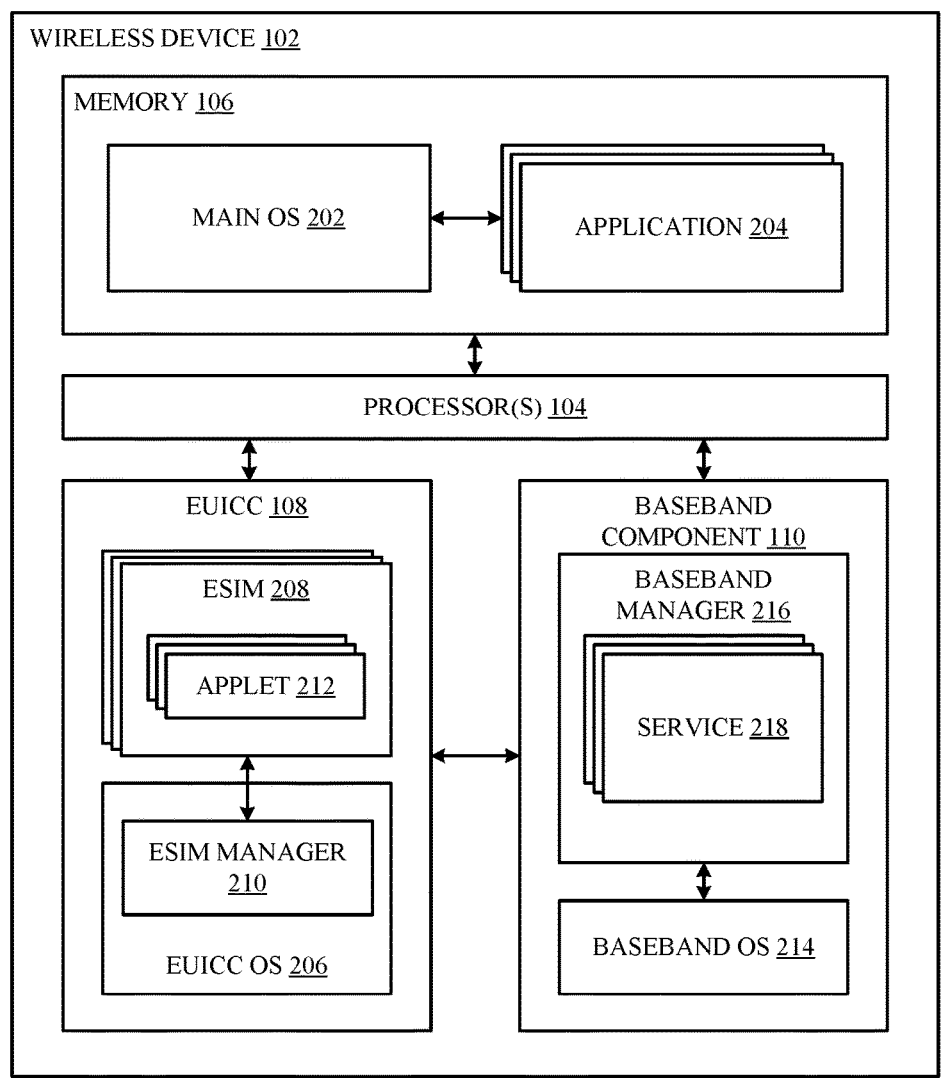
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the wireless device 102. The eUICC 108 OS can include an eSIM manager 210, which in some embodiments can be an Issue Security Domain (ISD) level application, a "security domain" in accordance with a GlobalPlatform specification, a security domain associated with one or more eSIMs and that calls additional eUICC OS installation services, and/or an application that implements a specific set of security services, e.g., for establishing and managing a secure channel and/or to provide encryption/decryption functions. The eSIM manager 210 can perform management functions for various eSIMs, such as coordinating with a baseband component 110 to establish a secure data connection to a network provisioning server 116, checking for eSIM updates, and obtaining and installing eSIM updates on the eUICC 108 as described further herein. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the wireless device 102 to communicate with an MNO 114 and provide useful features (e.g., phone calls and internet) to a user of the wireless device 102. An applet 212 can also provide for management of an eSIM 208, such as checking for, obtaining, and installing eSIM updates.

As also shown in FIG. 2, the baseband component 110 of the wireless device 102 can include a baseband OS 214 that is configured to manage hardware resources of the baseband component 110 (e.g., a processor, a memory, different radio components, etc.). According to some embodiments, the baseband component 110 can implement a manager 216 that is configured to interface with the eUICC 108 to implement various techniques described herein, which can include establishing a secure channel with a network provisioning server 116 and obtaining information (such as eSIM data) from the network provisioning server 116 for purposes of managing eSIMs 208, including but not limited to provisioning, loading, installing, adding, modifying, updating, deleting, or performing other management operations for one or more eSIMs 208. As also shown in FIG. 2, the manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

Figure 3:
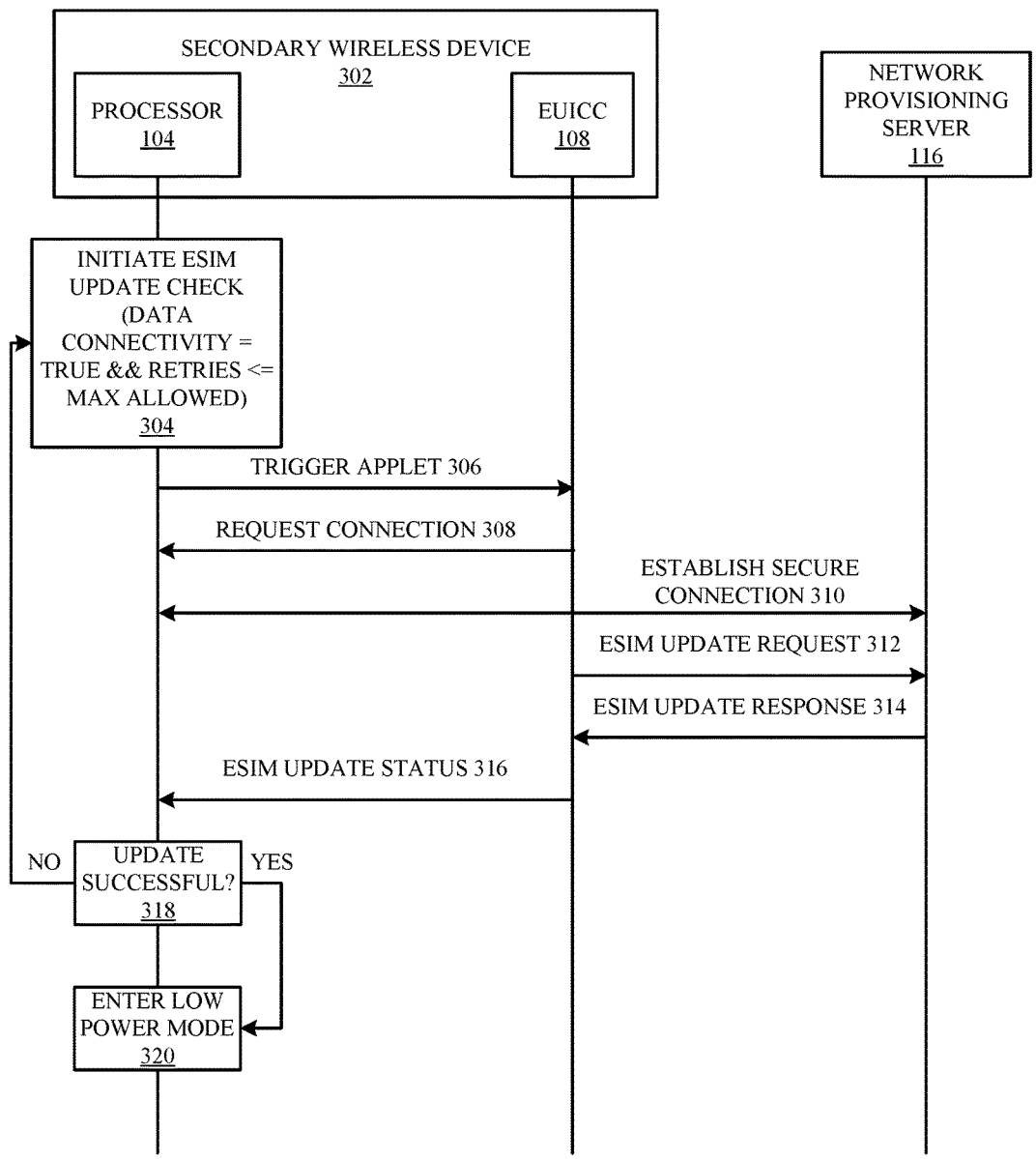
FIG. 3 illustrates an exemplary message exchange to provide an eSIM update for a secondary wireless device, according to some embodiments.

FIG. 3 illustrates a diagram 300 of an exemplary message exchange to provide eSIM updates to a secondary wireless device 302, according to some embodiments. At 304, a processor 104 of the secondary wireless device 302 initiates a process to check for updates for eSIMs of the eUICC 108 of the secondary wireless device 302. In some embodiments, the eSIM update process can be initiated based on a user triggered action, such as an input to the secondary wireless device 302 (or to an associated primary wireless device). In some embodiments, the eSIM update process can be initiated autonomously by the processor 104 of the secondary wireless device 302 without user input, such as based on expiration of a timer and/or based on whether the secondary wireless device 302 is connected to an external power source, such as via a magnetically coupled charger to a wrist wearable device. In some embodiments, the processor 104 of the secondary wireless device 302 checks for eSIM updates at least once per a predetermined time interval, such as once per day while connected to the external power source. In some embodiments, the eSIM update process proceeds only when data connectivity is available for the secondary wireless device 302, such as when an eSIM 208 of the eUICC 108 is enabled or activated, and/or when the secondary wireless device 302 is registered for service with a cellular wireless network. In some embodiments, the eSIM update process proceeds only when no more than a maximum number of retries to check for eSIM updates has occurred within a predetermined time period. When the eSIM update process proceeds, at 306, the processor 104 of the secondary wireless device 302 sends a message to the eUICC to trigger an associated applet 212 of the eSIM 208 to check for eSIM updates. In some embodiments, the applet 212 of the eSIM 208 is triggered based on the processor 104 sending to the eUICC 108 an application protocol data unit (APDU) command to check for eSIM updates. At 308, the eUICC 108 sends a message to the processor 104 of the secondary wireless device 302, the message including (or indicating) a request to establish a secure data connection, via a cellular wireless network, between the eUICC 108 and a network provisioning server 116 of the cellular wireless network. In some embodiments, the processor 104 of the secondary wireless device 302 communicates with a baseband component 110 to establish a cellular wireless connection to the cellular wireless network. In some embodiments, the processor 104 of the secondary wireless device 302 causes the baseband component 110 to awake from a power reduced state and establish the cellular wireless connection with the cellular wireless network. At 310, the processor 104 establishes a secure data connection between the network provisioning server 116 and the eUICC 108 of the secondary wireless device 302 using a cellular wireless connection via the cellular wireless network. After the secure data connection is established, at 312, the eUICC 108 communicates with the network provisioning server 116 to request an eSIM update. In some embodiments, the communication between the eUICC 108 and the network provisioning server 116 includes messages in accordance with a Bearer Independent Protocol (BIP) transaction process. At 314, the network provisioning server 116 responds to the eSIM update request with a response that includes an eSIM update for the eSIM 208 of the eUICC 108 of the secondary wireless device 302. In some embodiments, the requests and responses for the eSIM update includes multiple messages communicated between the eUICC and the network provisioning server 116 to obtain/retrieve the eSIM update. At 316, the eUICC 108 provides to the processor 104 of the secondary wireless device 302 a status message that indicates whether the eSIM update process succeeded or failed. At 318, the processor 104 determines whether the eSIM update process was successful based at least in part on the message from status message received from the eUICC 108. When the eSIM update process succeeds, at 320, the processor 104 of the secondary wireless device 302 can cause one or more modules of the secondary wireless device to enter a power reduced state. In some embodiments, the processor 104 of the secondary wireless device 302 causes the baseband component 110 to bring down the cellular data connection and subsequently enter a reduced power state, when the eSIM update process successfully completed. When the eSIM update process fails, the processor 104 of the secondary wireless device 302 can cause the eSIM update process to repeat until success occurs or until a maximum number of retries occurs. In some embodiments, repetition of the eSIM update process includes one or more of triggering the applet 212 of the eSIM 208 of the eUICC 108, establishing the secure data connection between the eUICC 108 and the network provisioning server 116 responsive to a connection request form the eUICC 108, retrieval of an eSIM update from the network provisioning server 116 by the eUICC 108 via the secure data connection, and reporting of the status of the eSIM update process to the processor 104 of the secondary wireless device 302.

Figure 4:
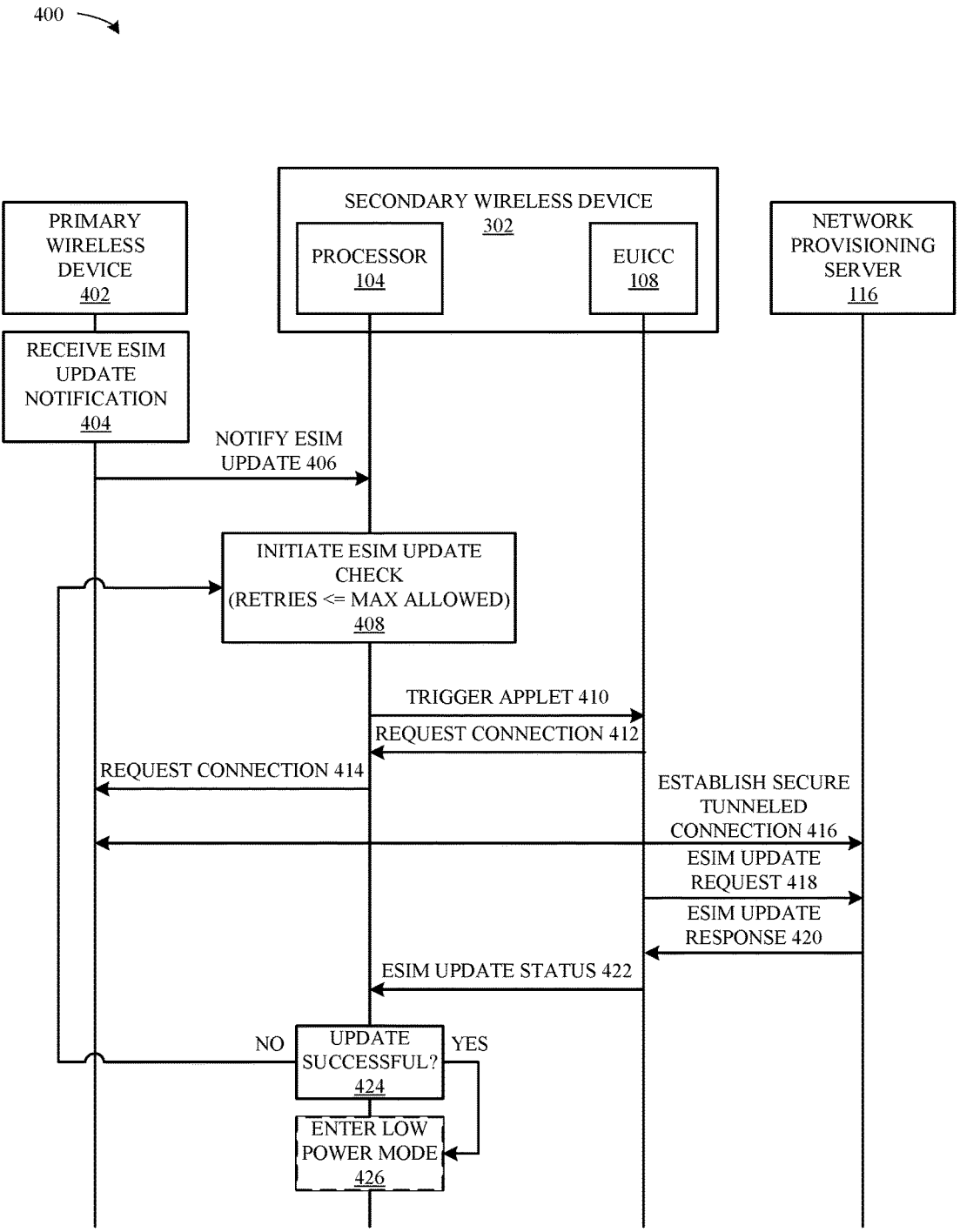
FIG. 4 illustrates another exemplary message exchange to provide an eSIM update for the secondary wireless device in conjunction with an associated primary wireless device, according to some embodiments.

FIG. 4 illustrates a diagram 400 of another exemplary message exchange to provide eSIM updates for a secondary wireless device 302 associated with a primary wireless device 402, according to some embodiments. In some embodiments, the eSIM update process illustrated in FIG. 4 occurs when the secondary wireless device 302 is in proximity of the primary wireless device 402 such that a non-cellular wireless connection between the secondary wireless device 302 and the primary wireless device 402 exists (or can be established by the primary wireless device 402). At 404, the primary wireless device 404 receives a notification that an eSIM update for an eSIM 208 of the eUICC 108 of the secondary wireless device 302 is available. In some embodiments, the primary wireless device 402 receives the notification as an Apple Push Notification Service (APNS) message sent to the primary wireless device 402 to trigger the eSIM update process. At 406, the primary wireless device 402 sends a message to the processor 104 of the secondary wireless device 302 to indicate availability of the eSIM update for the eSIM 208 of the eUICC 108 of the secondary wireless device 302. In some embodiments, the notification received by the primary wireless device 402 and/or the message sent to the processor 104 of the secondary wireless device 302 includes an APDU command for the processor 104 to send to the eUICC 108 of the secondary wireless device 302 to initiate the eSIM update process. At 408, the processor 104 of the secondary wireless device 302 initiates the eSIM update process. In some embodiments, the eSIM update process is initiated conditionally based on whether a maximum number of retries of the eSIM update process has occurred within a predetermined time period. When the eSIM update process proceeds, at 410, the processor 104 of the secondary wireless device 302 sends a message to the eUICC 108 of the secondary wireless device 302 to trigger an applet 212 of the eSIM 208 of the eUICC 108 to update the eSIM 208. At 412, the eUICC 108 sends a message to the processor 104 of the secondary wireless device 302, the message including (or indicating) a request to establish a secure data connection, via a cellular wireless network, between the eUICC 108 and a network provisioning server 116 of the cellular wireless network. At 414, the processor 104 of the secondary wireless device 302 sends a message to the primary wireless device 402 forwarding the request to establish the secure data connection to the network provisioning server 116. At 416, the primary wireless device 402 establishes a secure data connection to the network provisioning server 116, where the secure data connection traverses a cellular wireless connection between the primary wireless device 402 and a cellular wireless network and a non-cellular wireless connection between the primary wireless device 402 and the secondary wireless device 302. In some embodiments, the secure data connection is a secure tunneled OTA connection between the eUICC 108 of the secondary wireless device 302 and the network provisioning server 116 via the primary wireless device 402, where the processor 104 of the secondary wireless device 302 as well as the primary wireless device 402 act as conduits for communication of messages between the eUICC 108 and the network provisioning server 116, with limited if any access to reading the messages.

After the secure data connection is established, at 418, the eUICC 108 communicates with the network provisioning server 116 to request an eSIM update. In some embodiments, the communication between the eUICC 108 of the secondary wireless device 302 and the network provisioning server 116 includes messages in accordance with a Bearer Independent Protocol (BIP) transaction process. At 420, the network provisioning server 116 responds to the eSIM update request with a response that includes an eSIM update for the eSIM 208 of the eUICC 108 of the secondary wireless device 302. In some embodiments, the requests and responses for the eSIM update includes multiple messages communicated between the eUICC and the network provisioning server 116 to obtain/retrieve the eSIM update. At 422, the eUICC 108 provides to the processor 104 of the secondary wireless device 302 a status message that indicates whether the eSIM update process succeeded or failed. At 424, the processor 104 of the secondary wireless device 302 determines whether the eSIM update process was successful based at least in part on the message from status message received from the eUICC 108. When the eSIM update process succeeds, at 426, the processor 104 of the secondary wireless device 302 can optionally cause one or more modules of the secondary wireless device to enter a power reduced state. In some embodiments, the processor 104 of the secondary wireless device 302 can optionally cause the baseband component 110 to bring down the cellular data connection and subsequently enter a reduced power state, after the eSIM update process successfully completes. When the eSIM update process fails, the processor 104 of the secondary wireless device 302 can cause the eSIM update process to repeat until success occurs or until a maximum number of retries occurs. In some embodiments, repetition of the eSIM update process includes one or more of triggering the applet 212 of the eSIM 208 of the eUICC 108, establishing the secure data connection between the eUICC 108 and the network provisioning server 116 responsive to a connection request form the eUICC 108, retrieval of an eSIM update from the network provisioning server 116 by the eUICC 108 via the secure data connection, and reporting of the status of the eSIM update process to the processor 104 of the secondary wireless device 302.

Figure 5:
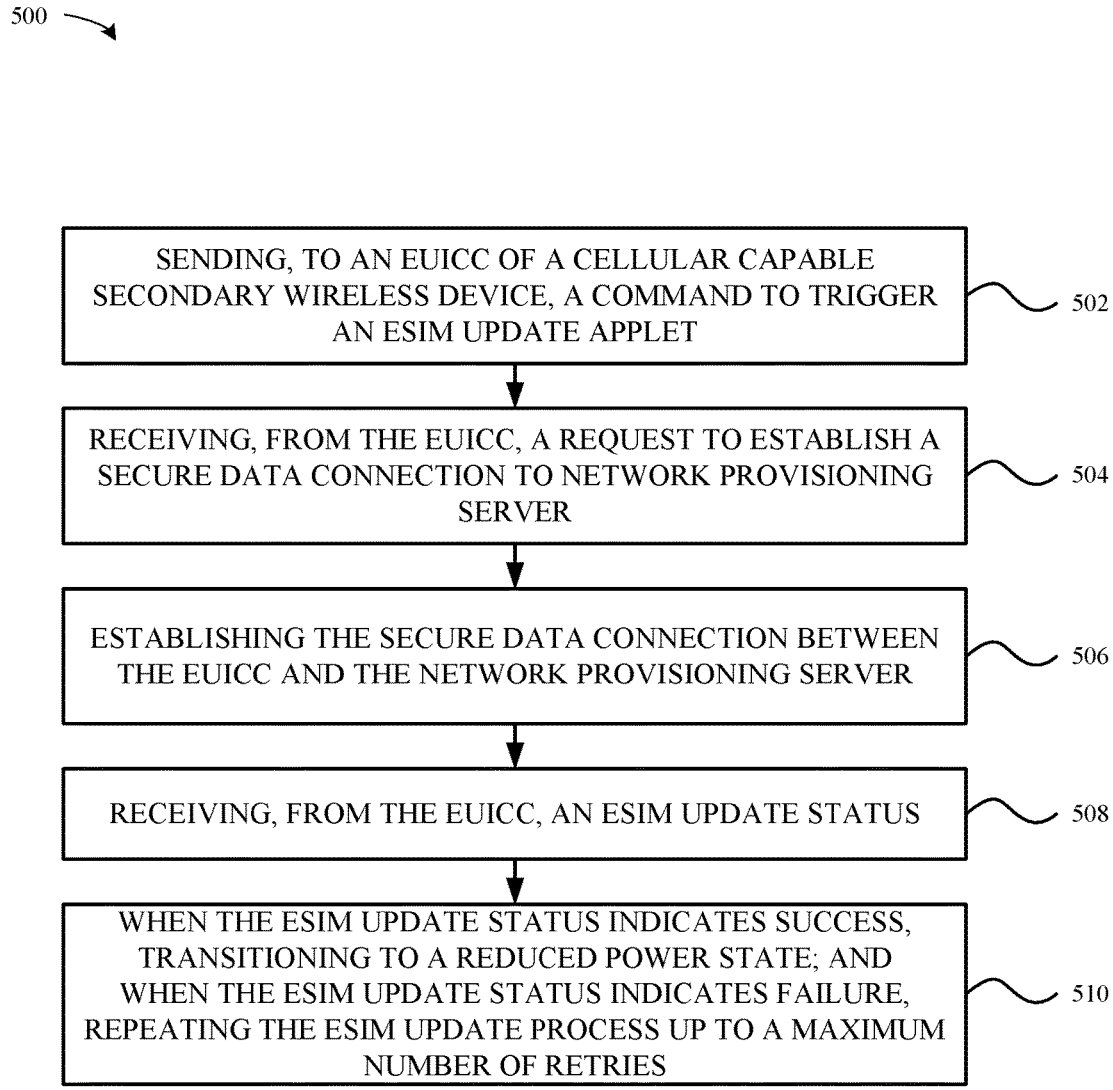
FIG. 5 illustrates a flow diagram of an exemplary method for providing eSIM updates directly to the secondary wireless device, according to some embodiments.

FIG. 5 illustrates a flow diagram 500 of an exemplary method for providing eSIM updates directly to the secondary wireless device 302 from the network provisioning server 116. At 502, processing circuitry, e.g., processor 104, of the secondary wireless device 302 sends to the eUICC 108 of the secondary wireless device 302 a command to trigger an applet 212 associated with an eSIM 208 of the eUICC 108. The applet 212 can initiate a process to check for updates and/or to update the eSIM 208. At 504, the processor 104 receives from the eUICC 108 a request to establish a secure data connection to the network provisioning server 116. At 506, the processor 104 causes the secondary wireless device 302 to establish the secure data connection to the network provisioning server 116. After establishment of the secure data connection, the eUICC 108 and the network provisioning server 116 communicate directly with each other, such as using a Bearer Independent Protocol (BIP) process to exchange messages (e.g., requests and responses) that provide for updating the eSIM 208 of the eUICC 108. At 508, the processor 104 receives from the eUICC 108 an eSIM update status message. At 510, when the eSIM update status message indicates that the eSIM update process succeeded, the processor 104 causes at least a portion of the secondary wireless device 302 to enter a power reduced state. Further at 510, when the eSIM update status messages indicates that the eSIM update process failed, the processor 104 causes the eSIM update process to repeat until success occurs or until a maximum number of retries occurs.

Figure 6:
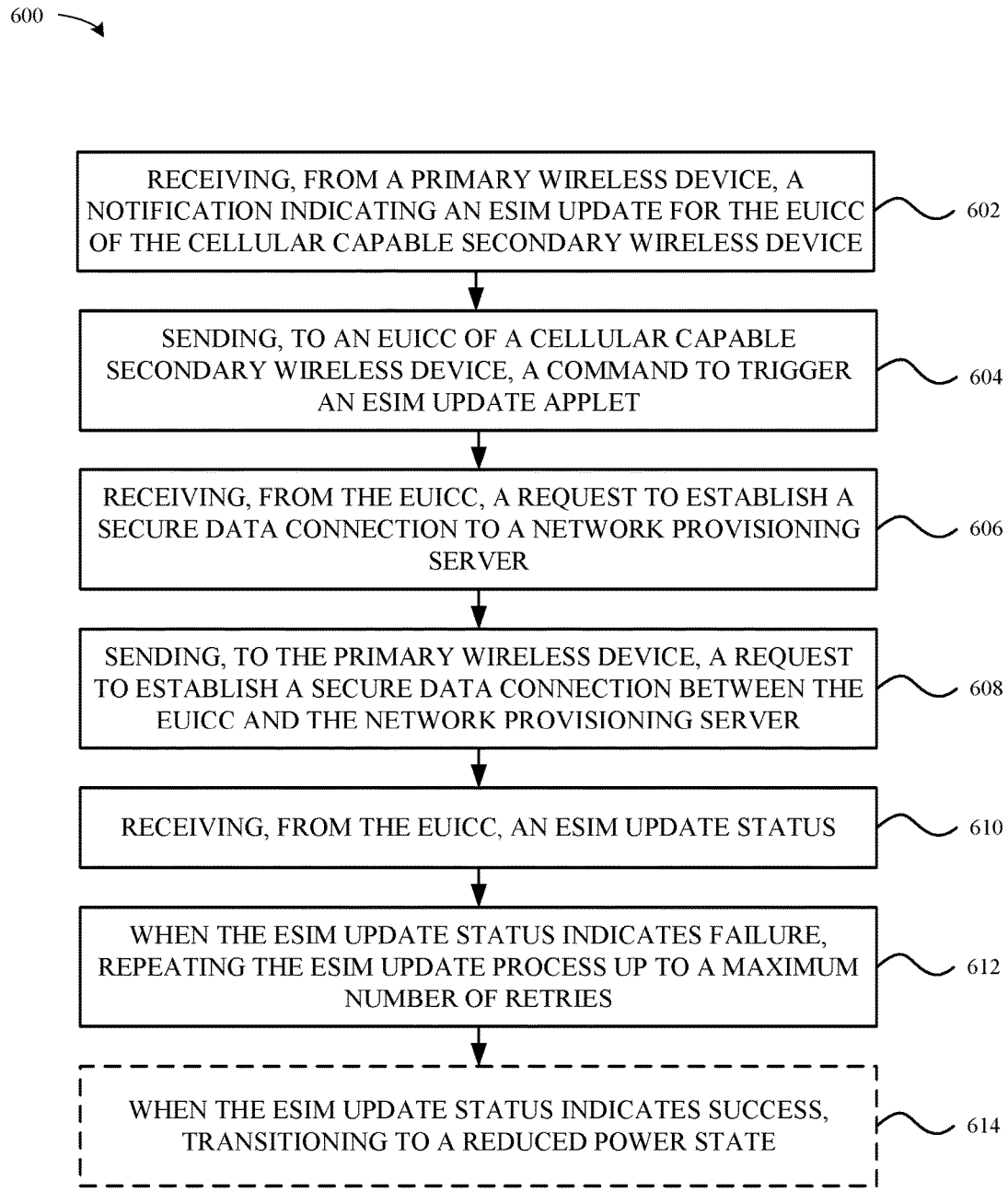
FIG. 6 illustrates a flow diagram of another exemplary method for providing eSIM updates indirectly to the secondary wireless device via the associated primary wireless device, according to some embodiments.

FIG. 6 illustrates a flow diagram 600 of another exemplary method for providing eSIM updates indirectly to the secondary wireless device 302 via a primary wireless device 402 from the network provisioning server 116. At 602, processing circuitry of the secondary wireless device 302, e.g., processor 104, receives from the primary wireless device 402 a notification indicating an eSIM update for an eSIM 208 of the eUICC 108 of the secondary wireless device 302. In some embodiments, the primary wireless device 402 sends the notification to the secondary wireless device 302 responsive to receipt of a message, e.g., an Apple Push Notification Service (APNS) message, to trigger an eSIM update process for the eSIM 208 of the eUICC 108 of the secondary wireless device 302. At 604, the processor 104 sends to the eUICC 108 of the secondary wireless device 302 a command to trigger an applet 212 on the eUICC 108. At 606, the processor 104 receives from the eUICC 108 a request to establish a secure data connection to the network provisioning server 116. At 608, the processor 104 sends to the primary wireless device 402 a request for the secure data connection to be established between the eUICC 108 and the network provisioning server 116. After establishment of the secure data connection, the eUICC 108 and the network provisioning server 116 communicate directly with each other, such as using a Bearer Independent Protocol (BIP) process to exchange messages (e.g., requests and responses) that provide for updating the eSIM 208 of the eUICC 108. At 610, the processor 104 receives from the eUICC 108 an eSIM update status message. At 612, when the eSIM update status messages indicates that the eSIM update process failed, the processor 104 causes the eSIM update process to repeat until success occurs or until a maximum number of retries occurs. At 614, when the eSIM update status message indicates that the eSIM update process succeeded, optionally in some embodiments, the processor 104 causes at least a portion of the secondary wireless device 302 to enter a power reduced state.

Figure 7:
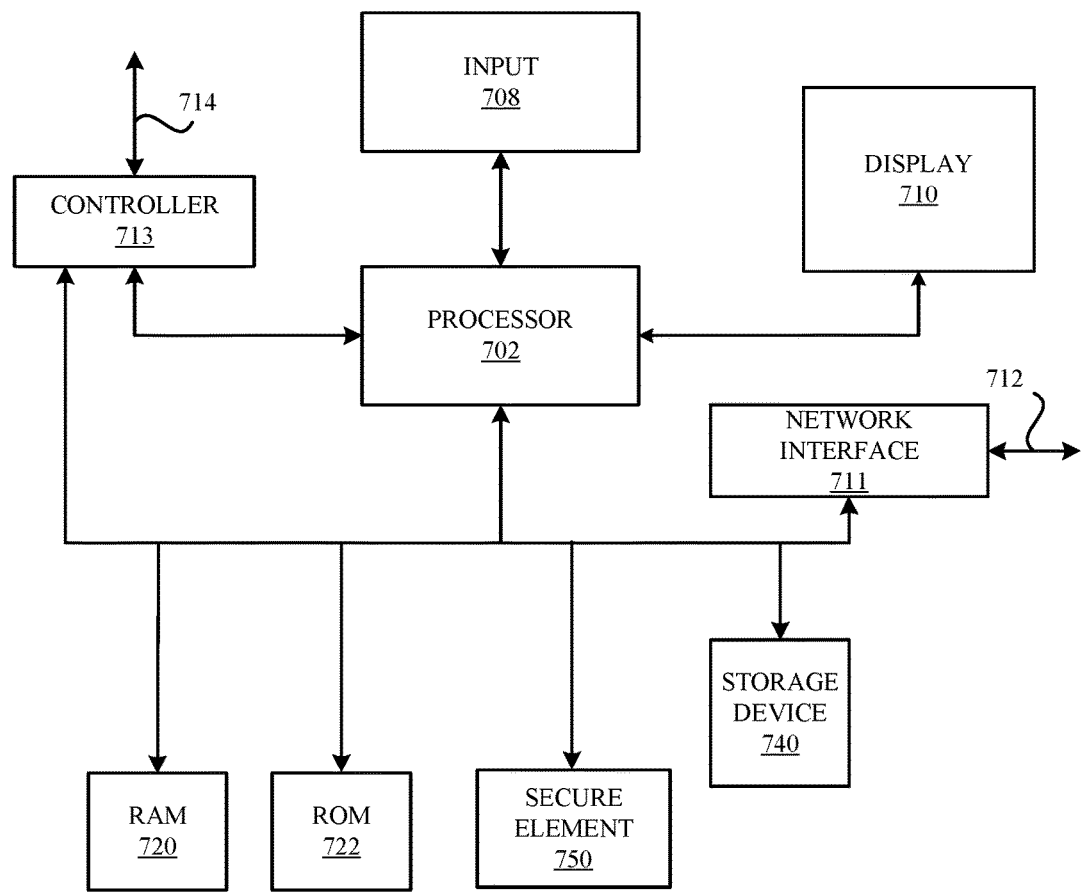
FIG. 7 illustrates a detailed view of a representative computing device that can be used to implement various methods described herein, according to some embodiments.

FIG. 7 illustrates a detailed view of a representative computing device 700 that can be used to implement various methods described herein, according to some embodiments. In particular, the detailed view illustrates various components that can be included in the wireless device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element 750, which can represent the eUICC 108 illustrated in FIGS. 1 to 4 and described in detail herein.

The various aspects, embodiments, implementations or features of the described embodiments can be used separately or in any combination. Software, hardware, or a combination of hardware and software can implement various aspects of the described embodiments. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless device configured for updating electronic Subscriber Identity Modules (eSIMs) of an embedded Universal Integrated Circuit Card (eUICC) included in the wireless device, the wireless device comprising:
   wireless circuitry comprising one or more antennas;
   the eUICC; and
   processing circuitry communicatively coupled to the wireless circuitry and external to the eUICC, the processing circuitry comprising one or more processors and a memory storing instructions that, when executed by the one or more processors, cause the processing circuitry to:
   perform an eSIM update process that includes:
      sending, to the eUICC, a command to trigger an eSIM update applet on the eUICC;
      receiving, from the eUICC, a request to establish a secure data connection to a network provisioning server;
      establishing the secure data connection between the eUICC and the network provisioning server; and
      receiving, from the eUICC, an eSIM update status; and
   repeat the eSIM update process until the eSIM update status indicates success or a maximum number of retries occurs.

2. The wireless device of claim 1, wherein execution of the instructions further causes the processing circuitry to enter a reduced power state when the eSIM update status indicates success.

3. The wireless device of claim 1, wherein the processing circuitry repeats the eSIM update process when the eSIM update status indicates failure.

4. The wireless device of claim 1, wherein the secure data connection includes a cellular wireless data connection between wireless device and the network provisioning server.

5. The wireless device of claim 1, wherein execution of the instructions further causes the processing circuitry to:
   send a request for an eSIM update to the network provisioning server in accordance with a bearer independent protocol (BIP); and
   receive one or more responses that include the eSIM update from the network provisioning server in accordance with the BIP.

6. The wireless device of claim 1, wherein the processing circuitry of the wireless device performs the eSIM update process responsive to receipt of a user-initiated update.

7. The wireless device of claim 1, wherein the processing circuitry of the wireless device performs the eSIM update process in response to expiration of an update timer while the wireless device is connected to an external power source.

8. An apparatus for updating electronic Subscriber Identity Modules (eSIMs) on an embedded Universal Integrated Circuit Card (eUICC) included in a secondary wireless device associated with a primary wireless device, the apparatus comprising:
   processing circuitry of the secondary wireless device external to the eUICC, the processing circuitry comprising one or more processors and a memory storing instructions that, when executed by the one or more processors, cause the processing circuitry to:
   perform an eSIM update process that includes:
      sending, to the eUICC, a command to trigger an eSIM update applet on the eUICC;
      receiving, from the eUICC, a request to establish a secure data connection to a network provisioning server;
      sending, to the primary wireless device, a request to establish the secure data connection to the network provisioning server; and
      receiving, from the eUICC, an eSIM update status; and
   repeat the eSIM update process until the eSIM update status indicates success or a maximum number of retries occurs.

9. The apparatus of claim 8, wherein execution of the instructions further causes the processing circuitry to enter a reduced power state when the eSIM update status indicates success.

10. The apparatus of claim 8, wherein the processing circuitry repeats the eSIM update process when the eSIM update status indicates failure.

11. The apparatus of claim 8, wherein the secure data connection includes a cellular wireless data connection between the primary wireless device and the network provisioning server.

12. The apparatus of claim 11, wherein the secure data connection further includes a non-cellular wireless data connection between the primary wireless device and the secondary wireless device.

13. The apparatus of claim 8, wherein the eUICC of the secondary wireless device is configured to:
    send a request for an eSIM update to the network provisioning server in accordance with a bearer independent protocol (BIP); and
    receive one or more responses that include the eSIM update from the network provisioning server in accordance with the BIP.

14. The apparatus of claim 8, wherein the processing circuitry performs the eSIM update process responsive to receipt of a notification from the primary wireless device, the notification indicating availability of an eSIM update for the eUICC.

15. A wireless device configured for updating electronic Subscriber Identity Modules (eSIMs) on an embedded Universal Integrated Circuit Card (eUICC) included in the wireless device, the wireless device comprising:
    wireless circuitry comprising one or more antennas; and
    the eUICC comprising a processor and a memory storing instructions that, when executed by the processor, cause the eUICC to:
        receive, from processing circuitry of the wireless device external to the eUICC, a command to trigger an eSIM update applet on the eUICC;
        provide, to the processing circuitry in response to the command to trigger the eSIM update applet, a request to establish a secure data connection to a network provisioning server;
        when the secure data connection is established between the eUICC and the network provisioning server, retrieve an eSIM update from the network provisioning server in accordance with a bearer independent protocol (BIP); and
        provide, to the processing circuitry, an eSIM update status that includes an indication of whether the eSIM update succeeded or failed.

16. The wireless device of claim 15, wherein the secure data connection includes a cellular wireless data connection between the wireless device and the network provisioning server.

17. The wireless device of claim 15, wherein secure data connection includes a cellular wireless data connection between a second wireless device associated with the wireless device and the network provisioning server.

18. The wireless device of claim 17, wherein the secure data connection further includes a non-cellular wireless data connection between the wireless device and the second wireless device.

19. The wireless device of claim 15, wherein retrieval of the eSIM update includes the eUICC of the wireless device:
    sending a request for the eSIM update to the network provisioning server in accordance with the BIP; and
    receiving one or more responses that include the eSIM update from the network provisioning server in accordance with the BIP.

20. The wireless device of claim 15, wherein the processing circuitry of the wireless device external to the eUICC repeats triggering of the eSIM update up to a maximum number of retries when the eSIM update status indicates failure.

* * * * *